March 9, 1954 H. HERNDON 2,671,553
FEED ATTACHMENT
Filed Sept. 27, 1948 2 Sheets-Sheet 1

INVENTOR.
Harvey Herndon
BY
Arnold H. Wells

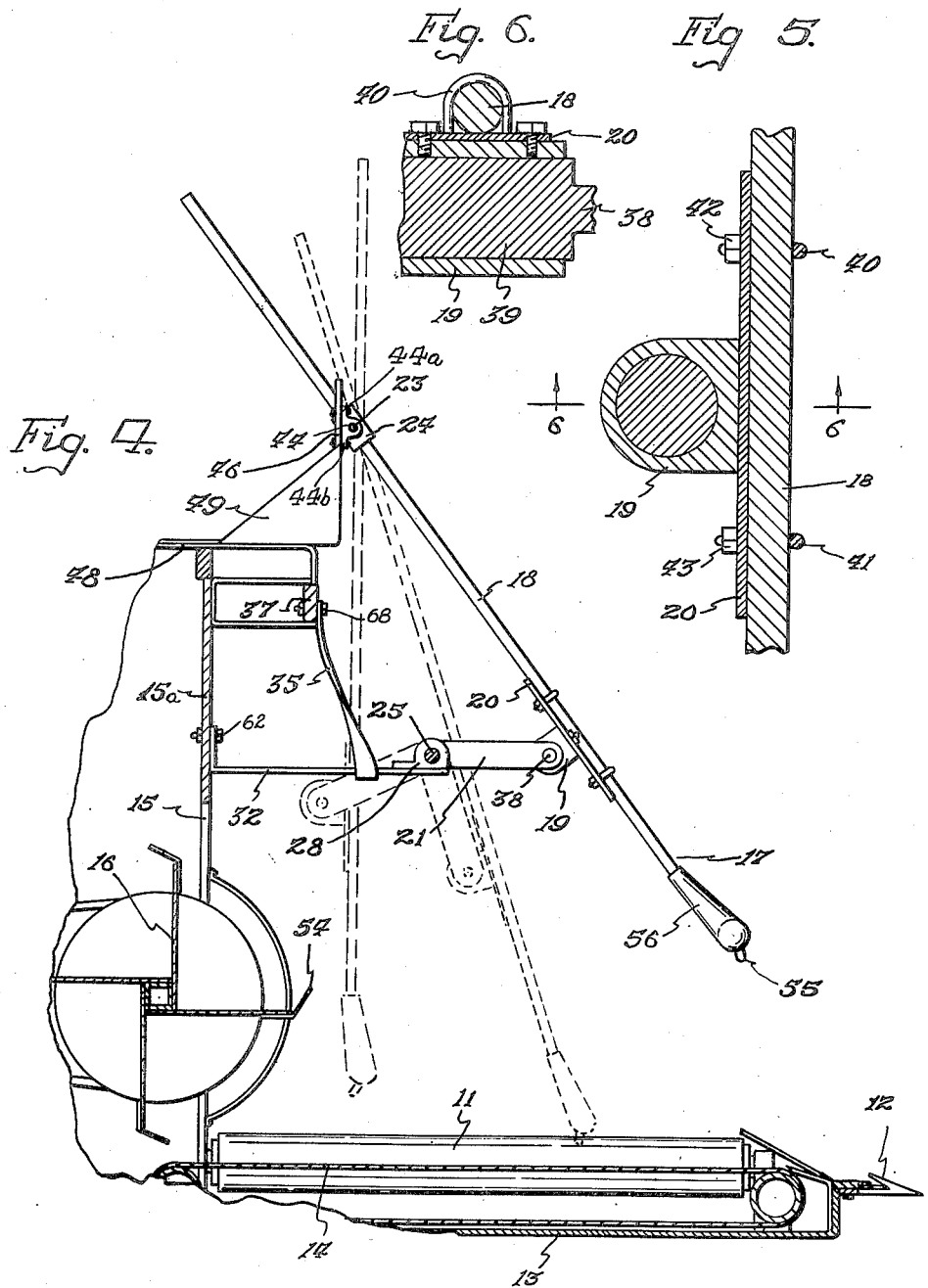

Patented Mar. 9, 1954

2,671,553

UNITED STATES PATENT OFFICE 2,671,553

FEED ATTACHMENT

Harvey Herndon, Lapwai, Idaho

Application September 27, 1948, Serial No. 51,437

2 Claims. (Cl. 198—166)

The present invention relates to improvements in a feed attachment.

In combined harvesters for cutting and threshing grain, it is customary to employ a cutting sickle with a reel above it and conveyors or drapers immediately back of the sickle to convey the cut grain to the cylinder of the threshing part of the harvester. In most of the larger machines, the drapers are arranged so that two of them run from the ends of the sickle parallel to the sickle toward the center thereof and deliver the cut crop to a center conveyor or draper that moves the crop away from the sickle to the cylinder inlet of the threshing part of the harvester. Much difficulty is encountered where the straw is quite heavy or bulky. Such seed crops as rape and mustard and tangled wheat and oats will pile up on the center feeder and refuse to feed back into the cylinder.

It is the purpose of my invention to provide a novel attachment which consists of a rake mounted over the feed draper and operable to press down the fluffy cut crop and work it back to the cylinder in cooperation with the feed draper.

I am aware that heretofore it has been proposed to employ reciprocating rakes to carry cut crops from a sickle to a cylinder. According to my invention however, I provide a more effective means for pressing the crop down and enabling the draper to perform its feeding operation, the rake as used in my invention being primarily for the purpose of compacting the crop and holding it while the draper feeds it forward to the cylinder rather than a feeding device itself.

Other and more detailed objects and advantages of my invention will appear from the following description and the accompanying drawings wherein a preferred form of the invention is shown. It should be understood however, that the drawings and description are illustrative only and are not to be considered as limiting the invention except insofar as it is limited by the claims.

In the drawings:

Figure 4 is a sectional view taken on the line 4—4 of Figure 1;

Figure 5 is an enlarged sectional view taken on the line 5—5 of Figure 1; and

Figure 6 is a sectional view taken on the line 6—6 of Figure 5.

Figure 3:
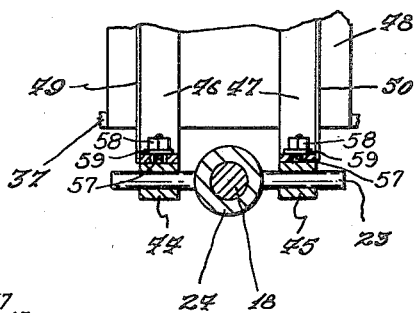
Figure 3 is a sectional view taken on the line 3—3 of Figure 2.

Referring now to the drawings, my invention is shown as applied to a combine harvester wherein the drapers 10 and 11 are side drapers adapted to feed the cut grain from the sickle 12 (Figure 4) from both ends of the machine toward the center thereof. The drapers 10 and 11 are mounted over a front platform 13 and a center draper 14 is also mounted over the platform 13 in position to move the crop cut by the central portion of the sickle and the crop delivered by the drapers 10 and 11 into a cylinder opening 15 at the front of the harvester. The grain is intended to be fed through the opening 15 by the rotating toothed cylinder 16. However, in certain types of crop that tend to pile up loosely on the center draper, feeding does not take place and the machine becomes clogged at the inlet 15.

According to my invention, I provide a rake 17 over the feed draper 14, operable to compact the crop thereon and hold it against the feed draper and the cylinder 16 to avoid the piling up in front of the inlet 15. My improved rake 17 has a stem 18 which is mounted by a bearing block 19 and a plate 20 between two crank arms 21 and 22. The stem 18 extends beyond the crank arms 21 and 22 and upwardly to a rock shaft 23 which has a bearing 24 slidably receiving the stem 18.

The crank arms 21 and 22 are supported by shafts 25 and 26 respectively. The shaft 25 is journalled in two bearings 27 and 28 and has a drive pulley 29 thereon by which it may be rotated from any suitable part of the harvester, such for example, as the shaft which supplies drive power to the harvester reel, not shown. The shaft 26 is journalled in a bearing 30. The bearings 27, 28 and 30 are supported by brackets 31, 32 and 33 respectively that project out from the front wall 15a of the harvester above the opening 15. To add rigidity to the support, straps 34, 35 and 36 are extended upwardly from the brackets 31, 32 and 33 respectively to a cross bar 37. The brackets 31, 32, and 33 are bolted to the front wall 15a by bolts 61, 62, and 63 respectively. The straps 34, 35 and 36 have horizontal portions 64, 65 and 66 respectively spot welded to the corresponding brackets 31, 32 and 33. The straps 34, 35 and 36 are bolted to the cross bar 37 by bolts 67, 68 and 69 respectively.

The bearing block 19 and the plate 20 rotate upon a shaft 38 that rigidly connects the crank arms 21 and 22. The shaft 38 has an enlarged central portion 39 journalled in the block 19. The plate 20 is adjustably connected to the stem 18 by two U-shaped clamps 40 and 41 which are threaded to receive nuts 42 and 43 respectively.

Figure 2:
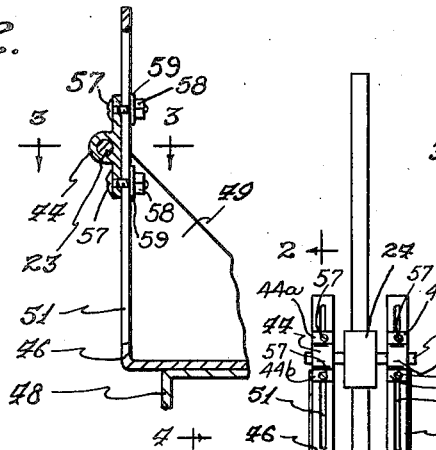
Figure 2 is an enlarged sectional view taken on the line 2—2 of Figure 1.
Figure 1:
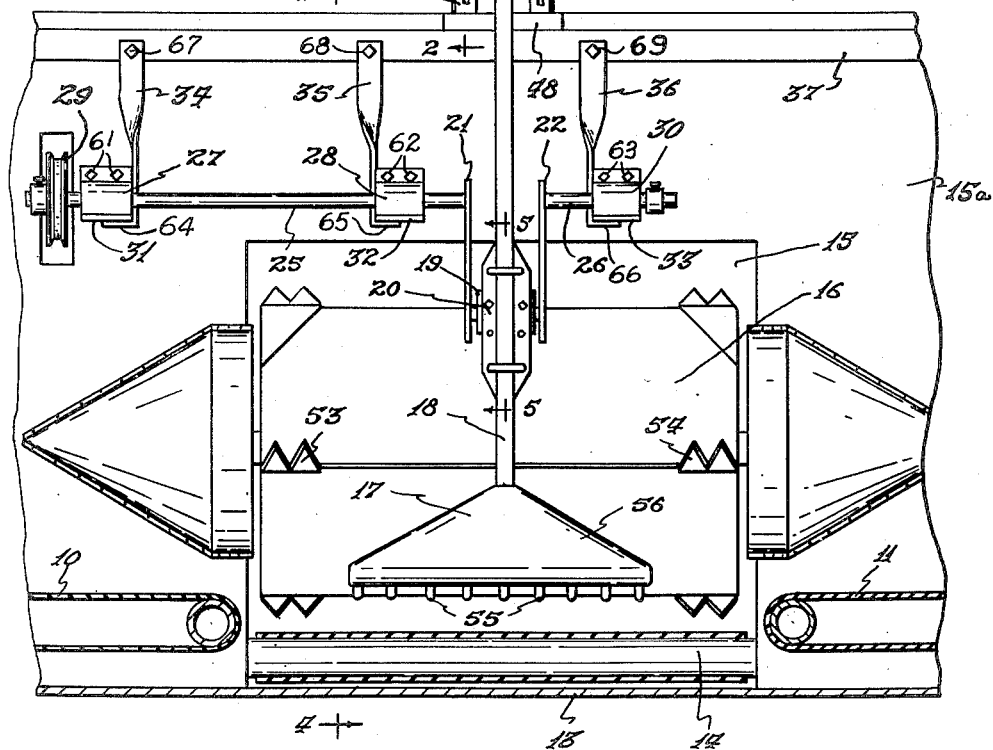
Figure 1 is a fragmentary front view of a combine harvester with the feeding drapers shown in section and looking into the cylinder inlet of the harvester.

Referring now to Figures 1, 2 and 3, the rock shaft 23 is supported by two bearings 44 and 45 which are adjustably mounted on two uprights 46 and 47 that are mounted at the top of the front wall 15a by a forwardly extending plate 48 which extends out to the cross bar 37. The uprights 46 and 47 have reenforcing flanges such as are indicated at 49 and 50 respectively. These uprights have elongated slots 51 and 52 respectively therein which serve to provide the adjustment of the shaft 23 up and down with respect to the crank arms 21 and 22 to determine the throw of the rake 17. Each of the bearings 44 and 45 is clamped to its respective upright by two screw bolts 57. A nut 58 and a washer 59 is provided for each bolt 57. One of the bolts 57 extends through each of the flanges 44a and 44b of the bearing 44 and through the slot 51. The nut 58 clamps the washer 59 against the upright. The bearing 45 has flanges 45a and 45b that receive bolts 57 for securing it to the upright 47 in the same manner that the bearing 44 is secured to the upright 46.

It will be noted that the feeding cylinder 16 has end teeth 53 and 54 with a space left between the teeth to align with the rake 17. As illustrated best in Figure 4, the rake teeth shown at 55, are carried down in their advancing motion to close proximity to the draper 14, then elevated closely to the inlet opening 15 so that any crop on the draper 14 will be pressed or padded down to engage the cylinder 16 as it is advanced by the draper 14. The rake member 17 is made triangular in shape with substantially smooth front and back faces 56 and short blunt teeth 55 at its lower edge and is rounded at the edges so as to prevent tangling of the crop thereon. The smooth front face 56 of the rake is effective in pressing the crop down and forwardly toward the opening 15 and the cylinder 16 after the crop has fallen on or is delivered to the draper 14 and advanced by the draper toward the opening 15.

It is believed that the nature and advantages of my invention will be clear from the foregoing description. Having thus described my invention, I claim:

1. In a harvester having a housing provided with a feed inlet opening, a draper extending into said housing through said opening and side drapers delivering cut crops to the first named draper, the improvement in compressing and feeding means for moving crops through said opening on said draper, said means comprising a feed cylinder mounted to rotate in said opening over said draper, a raking and compressing member extending transversely in front of said cylinder and overlying the draper, said raking and compressing member having a wide lower surface facing downward toward said draper and adapted to compress the crops against said draper before they come into contact with the cylinder, a crank shaft mounted on and spaced in front of the housing above the raking and compressing member, means to drive said shaft, a crank arm fixed to said shaft, a stem fixed to the raking and compressing member and extending upwardly therefrom, said stem being pivotally secured to the crank arm at a distance above the raking and compressing member, and a guide member pivoted on the housing and spaced above the crank arm, said stem being slidable in the guide member.

2. In a harvester having a housing provided with a feed inlet opening, a draper extending into said housing through said opening and side drapers delivering cut crops to the first named draper, the improvement in compressing and feeding means for moving crops through said opening on said draper, said means comprising a feed cylinder mounted to rotate in said opening over said draper, a raking and compressing member extending transversely in front of said cylinder and overlying the draper, said raking and compressing member having a wide lower surface facing downward toward said draper and adapted to compress the crops against said draper before they come into contact with the cylinder, a crank shaft mounted on and spaced in front of the housing above the raking and compressing member, means to drive said shaft, a crank arm fixed to said shaft, a stem fixed to the raking and compressing member and extending upwardly therefrom, said stem being pivotally secured to the crank arm at a distance above the raking and compressing member, and a guide member pivoted on the housing and spaced above the crank arm, said stem being slidable in the guide member, said raking and compressing member having short teeth extending downwardly from the lower surface thereof and toward said opening.

HARVEY HERNDON.

References Cited in the file of this patent

UNITED STATES PATENTS

| Number | Name | Date |
| --- | --- | --- |
| 348,398 | Jewett | Aug. 31, 1886 |
| 422,353 | Paridy et al. | Feb. 25, 1890 |
| 1,036,467 | Djunkofsky | Aug. 20, 1912 |
| 1,057,040 | Croan | Mar. 25, 1913 |
| 1,098,502 | Jahn | June 2, 1914 |
| 1,196,070 | Barnedt et al. | Aug. 29, 1916 |
| 1,383,910 | Dowden | July 5, 1921 |
| 1,565,418 | Colianni | Dec. 15, 1925 |
| 1,674,158 | Collier | June 19, 1928 |
| 1,952,331 | Jewett | Mar. 27, 1934 |
| 1,994,298 | Anderson | Mar. 12, 1935 |
| 2,056,344 | Darnell | Oct. 6, 1936 |
| 2,109,436 | Schowengerdt | Feb. 22, 1938 |
| 2,301,088 | Stahl | Nov. 3, 1942 |
| 2,409,478 | Dickow | Oct. 15, 1946 |
| 2,455,905 | Ronning et al. | Dec. 7, 1948 |
| 2,496,524 | Dunaway | Feb. 7, 1950 |
| 2,529,180 | Oehler | Nov. 7, 1950 |